United States Patent [19]

Deacon

[11] 4,242,114
[45] Dec. 30, 1980

[54] DUST COLLECTOR

[75] Inventor: James S. Deacon, North Olmsted, Ohio

[73] Assignee: McLaughlin, Inc., Middletown, Ohio

[21] Appl. No.: 56,783

[22] Filed: Jul. 11, 1979

[51] Int. Cl.³ .............................................. B01D 46/04
[52] U.S. Cl. ......................................... 55/304; 55/112
[58] Field of Search .................. 55/112, 300, 304, 305, 55/341 NT, 344, 341 R; 210/388; 209/381; 165/84

[56] References Cited

U.S. PATENT DOCUMENTS

| | | | |
|---|---|---|---|
| 1,240,305 | 9/1917 | Brooks et al. | 55/304 |
| 1,847,304 | 3/1932 | Bradshaw et al. | 55/344 |
| 1,884,501 | 10/1932 | Andrews et al. | 55/344 |
| 2,392,088 | 1/1946 | Hamilton et al. | 55/112 |
| 2,477,623 | 8/1949 | Kling | 55/341 R |
| 2,732,030 | 1/1956 | Dorfan | 55/304 |
| 3,395,519 | 8/1968 | Kleissler | 55/341 NT |
| 3,864,106 | 2/1975 | Brandt | 55/341 NT |

*Primary Examiner*—David L. Lacey

*Attorney, Agent, or Firm*—Pearne, Gordon, Sessions, McCoy & Granger

[57] ABSTRACT

A dust collector for cleaning particle-laden air by means of a plurality of filter bags through which the air is passed. The dust collector includes an inlet chamber adapted to receive particle-laden air and an outlet chamber for clean air. The filter bags are supported in the outlet chamber with their lower ends communicating with the inlet chamber and with their upper ends supported by a shaker mechanism adapted to impart at certain selected time intervals a sinusoidal motion to the bags to dislodge accumulations of dust that form therein. The shaker mechanism includes a drive motor and a variable-throw, eccentric crank means. The inlet chamber has means at the bottom thereof for receiving and removing accumulations of dust, including the dust accumulations that are removed from the filter bags. Particle-laden air is introduced into the inlet chamber through a distributor manifold that extends substantially into and across the length of the inlet chamber and which has a plurality of ports formed therein, located and dimensioned to provide a uniform distribution of particle-laden air into the inlet chamber and then to the filter bags.

4 Claims, 11 Drawing Figures

DUST COLLECTOR

BACKGROUND OF THE INVENTION

This invention relates to dust collectors for cleaning particle-laden air, and especially to the type of dust collector that utilizes a plurality of vertically supported filter bags from which accumulations of dust can be shaken loose at certain time intervals when the system is not operating. More particularly, the invention relates to two unique design features adapted for use in such dust collectors, one of which deals with the adjusting of the amplitude of the shaking motion used periodically to remove the dust accumulations in the filter bags and the other of which deals with an improved means for initially distributing the particle-laden air in proper proportion to the lower ends of the filter bags.

In certain commercial operations and processes, such as sand blasting, abrasive cleaning, grinding, and others, dust and other solid particles are produced that must be removed from the atmosphere in order to protect the workman and equipment. The dust collecting equipment that is often used for this purpose has a housing with a series of elongated filter bags mounted therein and the air to be cleaned is passed through the walls of the bags, the solid particles being deposited on the interior surface of the bag. In order to keep the bags relatively clean to realize the desirable efficiency, the bags are usually shaken or agitated at proper intervals to remove the accumulations of dust. The accumulations are usually collected in a hopper below and removed from he housing.

In dust collectors of this type, it is desirable that the air be passed to the filter bags in a smooth, uniform manner, with a minimum of friction loss, and in such a way that the larger and heavier particles are thrown out of the flow path prior to the passage of air through the bags.

The individual filter bags are normally suspended from a hook or other means of suspension connected to a mechanism which is capable of shaking the bags with a back and forth motion, such as a swinging or arcuate motion. It is well known in the art that speed, stroke, span, and excursion of the bag support member during the shaking operation have a material effect on the bag cleaning process. Increase in stroke or excursion bears a linear relationship to the bag cleaning operation.

In a typical shaker mechanism for imparting the desired shaking motion to the filter bags to dislodge particles, the bags are positioned in parallel rows and the upper ends are connected by hooks or the like to pivot shaft assemblies which are oscillated back and forth when the shaking action is accomplished. Usually, a row of bags is located at each side of the pivot shaft assembly so that two rows of bags can be shaken simultaneously. The pivot shaft assemblies generally have a crank arm that is moved to and fro by links which may be connected to two or more crank arms of the pivot shaft assemblies. The links are operatively connected to some type of eccentric crank mechanism which is operatively associated with a drive motor.

Particulates that are filtered out of the air stream form a dust cake on the filter medium. The cake varies in weight and depth, dependent on several factors including dust particle size and density. A small amount of cake improves filter efficiency by reducing permeability in the filter medium. A large amount of cake tends to restrict air flow through the filter, and a portion of the cake must be removed on some regular schedule. If cleaning of the filter medium is too vigorous, all of the dust cake may be removed, with a temporary loss in dust capture efficiency and with undue stresses in the filter material. If cleaning is not vigorous enough, there will be a continuing buildup in dust cake with restrictions to air flow.

The amplitude of cleaning action must be adjustable to compensate for changes in size and physical properties of the dust particles. The amplitude of cleaning must also be adjusted to suit the filter medium as this material varies in weave and weight and finish. An open weave of rough texture will not release the dust cake as readily as a dense weave of smooth texture. The prior art does not provide for easy adjustment of the shaker mechanism to suit these variables.

Another problem encountered with prior art devices is the unequal distribution of incoming dust and air to the plurality of filter bags that compose a dust collector unit. Normal practice is to have a single inlet for the dusty air stream. This system supplies a major amount of air and dust to the nearest bags and a minor amount to those in a far corner. Filter bags receiving the heaviest load will be less efficient and will show abrasion of filter material and a short life span. Filter bags with a small portion of dust and air will be most efficient and have the longest life span. In addition, the travel time for a dust particle to the nearest filter bag does not allow time for heavy particles to settle out by gravity before reaching the filter bag.

The apparatus of the present invention provides for reducing the entering air velocity to a level where heavy particles are released by gravity before reaching the filter medium. This apparatus divides the incoming air stream into two ducts that extend across the inlet chamber. Air velocities are reduced in the twin inlet ducts, and each duct is fitted with a plurality of nozzles that distribute the dusty air at a uniform low velocity toward the filter bags. The spacing of inlet ducts and nozzles ensures that each filter bag receives an equal amount of dust and air. Dust capture efficiency is enhanced by distributing the dust load uniformly, and abrasion of the filter medium is reduced by lower velocities and less dust.

The apparatus of the present invention, however, minimizes the difficulties indicated above and affords other features and advantages heretofore not obtainable.

SUMMARY OF THE INVENTION

It is among the objects of the invention to provide an improved, uniform distribution of particle-laden air to a plurality of filter bags in a dust collector system.

Another object of the invention is to facilitate the adjustment of a shaker mechanism in a filter bag type dust collector system so that the amplitude of the shaking motion imparted to the filter bags can be optimized.

These and other objects and advantages are accomplished with the unique dust collector system described herein, wherein as one aspect of the invention there is provided a bag shaker mechanism for shaking a plurality of filter bags which receive and collect accumulations of dust and other particles as dust-laden air is drawn upwardly therethrough. The filter bags are supported at the top by the shaker mechanism and are adapted to be periodically shaken to dislodge and remove accumulated dust. The shaker mechanism comprises a pivotal means adapted to pivot back and forth to produce a sinusoidal shaking of the bags, a crank arm connected to the pivot means, link means operatively connected to the crank arm, and a rock shaft means with rock arms connected to the link means. The rock shaft is operated by a connecting rod which is connected to an eccentric driven by a rotary drive motor with a shaft on which the eccentric is mounted.

In accordance with the invention, the eccentric means comprises a hub having a main bore at one end with a key slot formed therein and adapted to receive the motor shaft, and having a secondary bore at its other end with a key slot formed therein. The axis of the secondary bore is offset from the axis of the main bore. A crank pin member having a cylindrical main body with a plurality of key slots therein is received in the secondary bore in one of a plurality of optional positions. The position of the main body of the crank pin member is determined by the particular key slot that is selected to be aligned with the key slot in the bore. This determines the actual throw of the eccentric crank pin or, in other words, the distance between the axis of the motor shaft and the axis of the crank pin.

In accordance with another aspect of the invention, the dust collector system is provided with a specially designed inlet air duct means that extends into the inlet chamber that is adapted to receive particle-laden air. The inlet air duct means comprises an elongated air distributor manifold that extends substantially the length of the inlet chamber and which has a plurality of lateral ports spaced along the opposite sides thereof to distribute the supply of particle-laden air to the inlet chamber in a uniform manner so that a relatively uniform flow distribution to all of the filter bags is achieved.

DESCRIPTION OF THE PREFERRED EMBODIMENT

Figure 1:
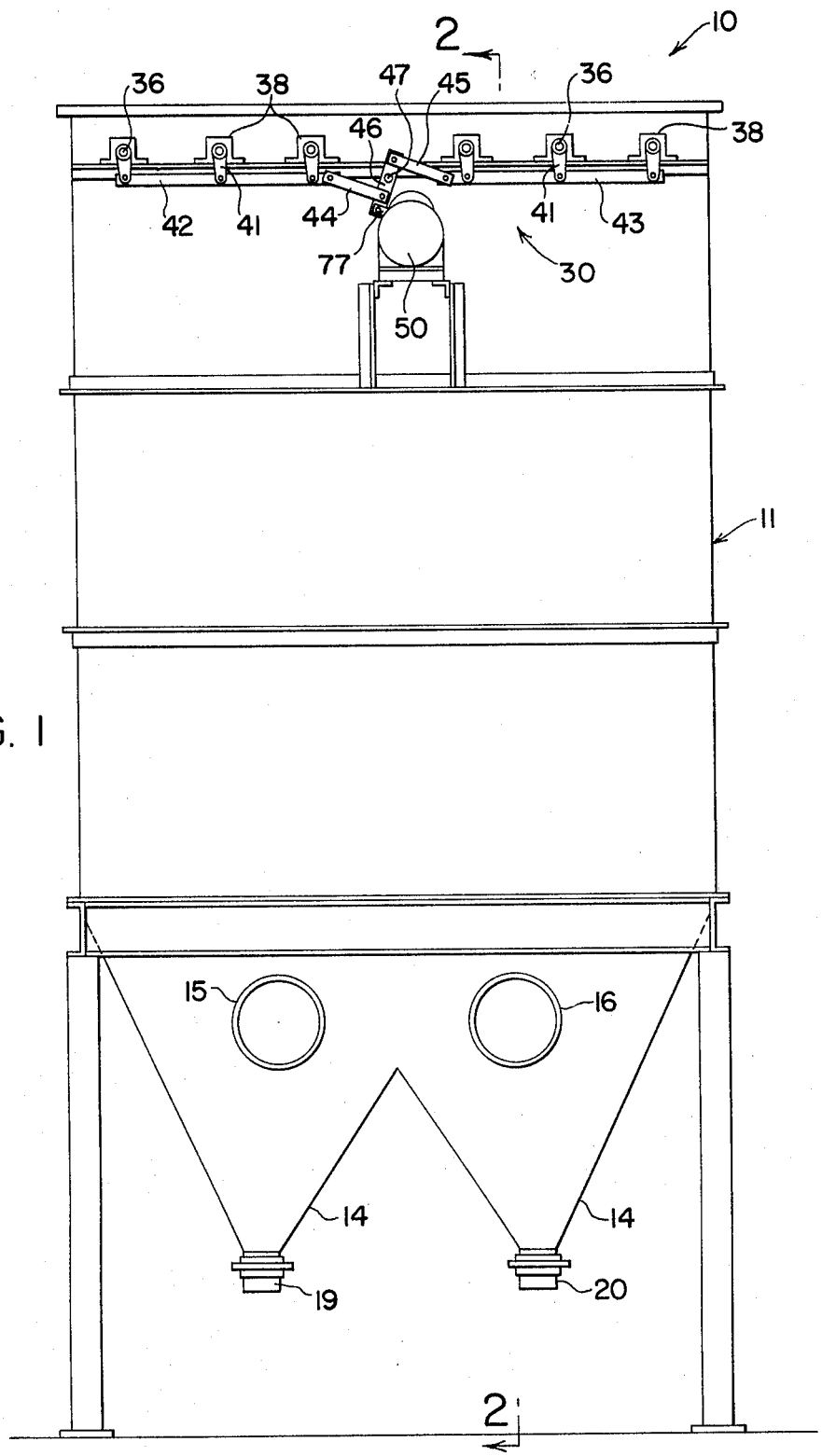
FIG. 1 is an elevational view of a dust collector embodying the invention.
Figure 2:
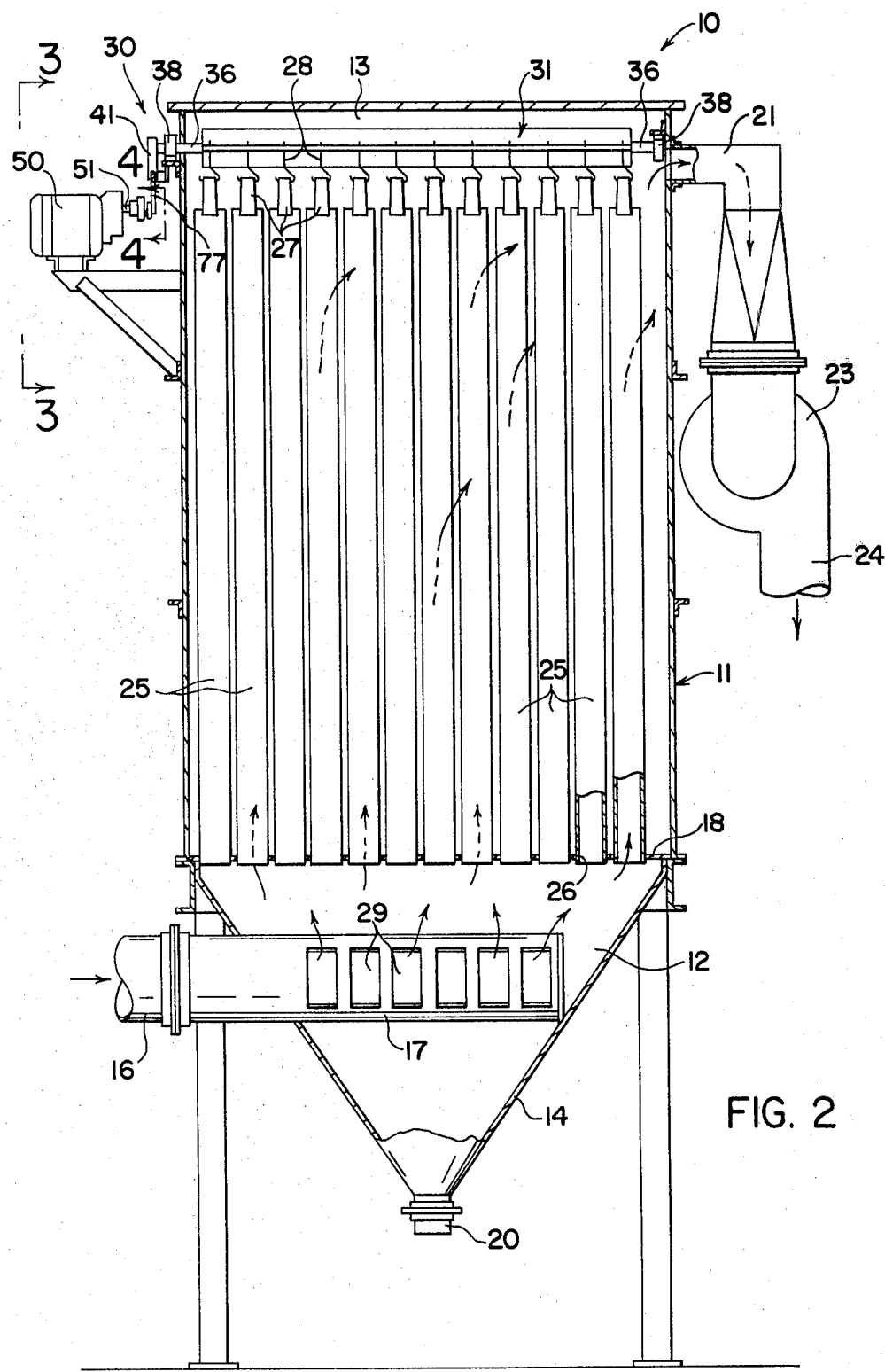
FIG. 2 is a sectional view of the dust collector of FIG. 1, taken on the line 2—2 of FIG. 1, with parts broken away and shown in section for the purpose of illustration.

Referring more particularly to the drawings, and initially to FIGS. 1 and 2, there is shown a dust collector 10 for removing particles from dust-laden air and which generally comprises a housing 11 and inlet plenum chamber 12 at the bottom end of the housing 11. The housing defines a clean air chamber 13 in which an array of elongated filter bags 25 are supported. The inlet plenum chamber is provided with two conical hoppers 14 to facilitate collection and removal of dust particles separated out from the dust-laden air. Also, two inlet ducts 15 and 16 direct the particle-laden air into the inlet plenum chamber 12. Each of the inlet ducts 15 and 16 is provided with a distributor manifold 17 embodying the invention, and which extends across the respective hopper 14, as best shown in FIG. 2.

The inlet plenum chamber 12 is separated from the clean air chamber 13 by means of a cell plate 18, with a plurality of openings for the bottom ends of an array of filter bags 25. Particle-laden air passes from the inlet air plenum through the openings in the plate 18 and into the filter bags 25.

Located at the bottom of each of the hoppers 14 are cleanout fittings 19, 20 which may be opened to permit removal of dust that accumulates in the respective hoppers and which is shaken from the filter bags 25 during the shaking process when the dust collector blower is shut down.

An exhaust duct 21 for clean air is connected to the top of the housing 11 and clean air is drawn through the duct 21 by a centrifugal blower 23 which exhausts air through a discharge pipe 24.

The filter bags 25, as indicated above, are connected at the bottom ends to openings 26 in the cell plate 18 and the upper ends thereof have a strap 27 which is engaged by a plurality of J-hooks 28, which are attached at their upper ends to the shaker mechanism 30. As indicated above, the filter bags 25 are located in parallel rows—in the present instance, in 12 parallel rows of 12 each, so that there are 144 filter bags altogether.

During operation of the collector, particle-laden air enters through the two inlet ducts 15 and 16 and is distributed through slots 29 in the distributor manifolds 17 to the lower ends of the filter bags 25. The slots 29 on opposite sides of the distributor manifolds 17 control the air flow such that it is uniformly distributed to the filter bags 25, thus avoiding any heavy concentration of flow in one particular area. Accordingly, the filter bags 25 all receive a proportionate share of the flow of particle-laden air. Because there is a substantial velocity drop as the air leaves the distributor manifold, some of the dust particles present in the air stream fall out into the hoppers 14 before the air enters the filter bags 25. In a typical situation, the velocity of the air stream drops from about 4000 feet per minute to about 400 feet per minute when it enters the inlet plenum. With this in mind, the number of slots and the total area thereof are relative, to bear a proper relationship to the cross sectional area of the inlet ducts 15 and 16.

As the air passes through the walls of the filter bags 25, dust is removed and deposited on the interior surfaces thereof and the clean air passes upwardly and out through the exhaust duct 21. As the operation continues, relatively large quantities of dust particles accumulate on the interior walls of the filter bags 25 and form what is commonly called a "filter cake." Eventually, the filter cake collects to the point where air flow is impeded and the filtering operation is hampered. At this time it is necessary to dislodge and remove the filter cake in the filter bags 25 so that the cake drops into the hoppers 14 and may be removed through the cleanout fittings 19 and 20. In order to accomplish the removal of the filter cake, the system is shut down and the shaker mechanism 30 is operated to shake the bags and dislodge the filter cake.

Figure 3:
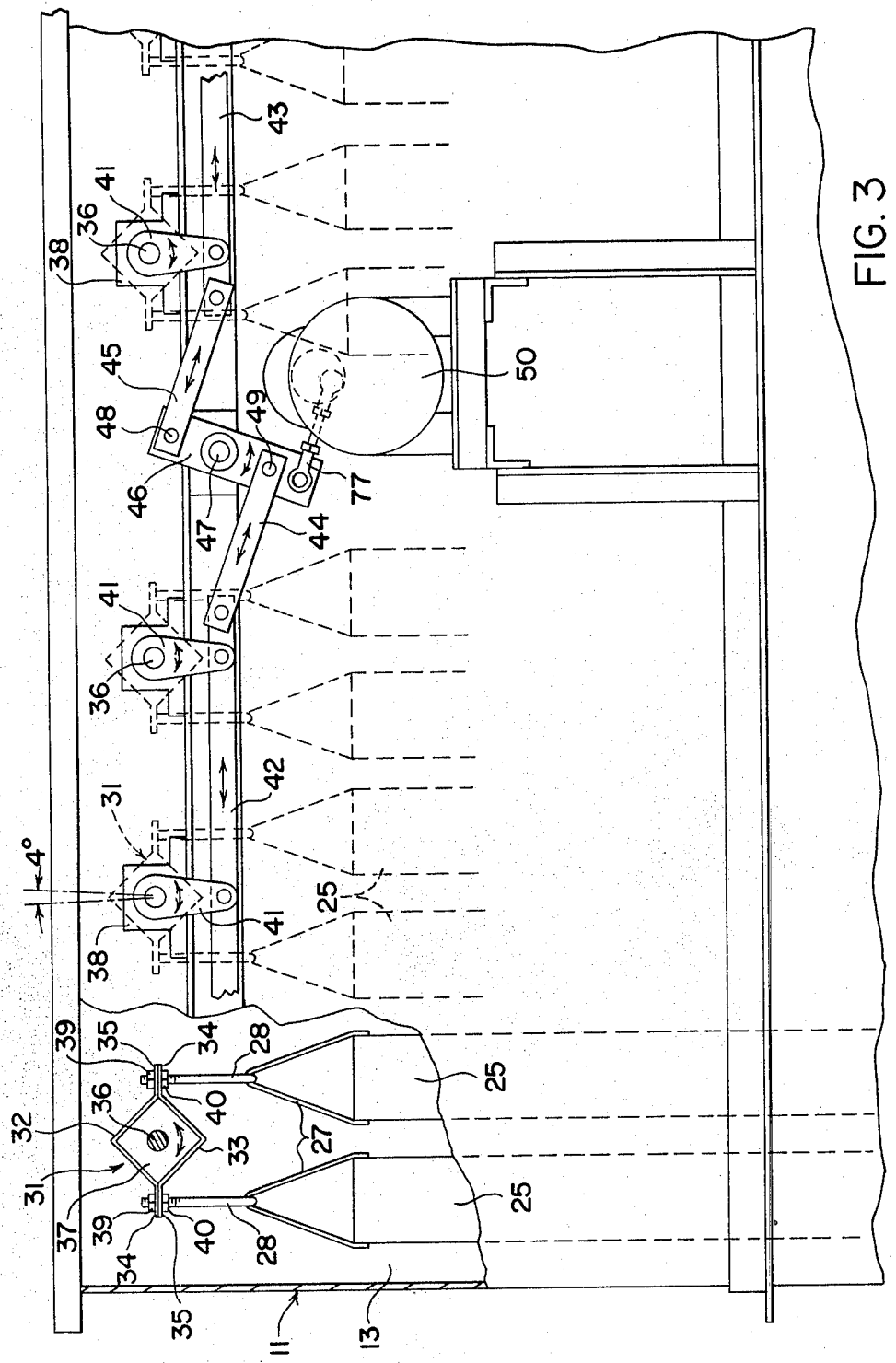
FIG. 3 is a fragmentary, sectional view on an enlarged scale, taken on the line 3—3 of FIG. 2, and with parts broken away and shown in section for the purpose of illustration.
Figure 4:
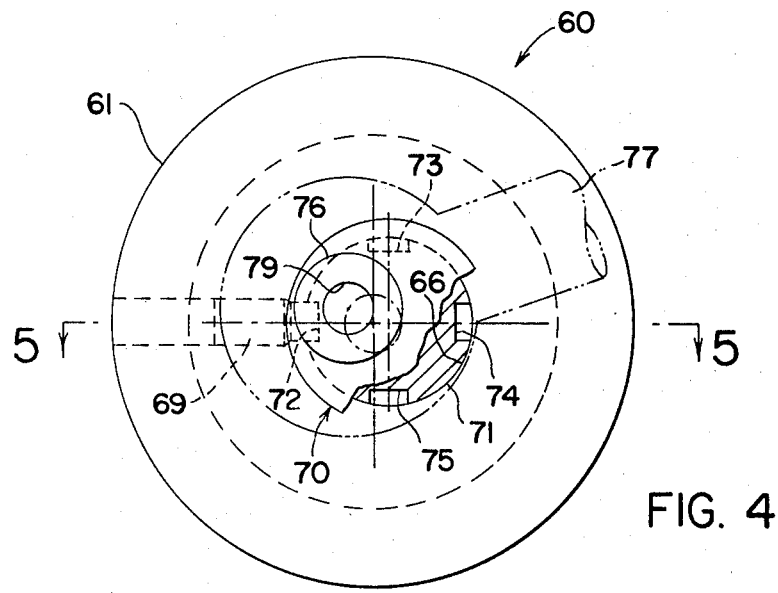
FIG. 4 is a fragmentary, sectional view on a still larger scale, taken on the line 4—4 of FIG. 2 and with parts broken away and shown in section for the purpose of illustration.

The shaker mechanism 30 includes six parallel bag support beams 31 that extend from one side of the housing 11 to the other (FIG. 2). The bag support beams 31 each comprise a pair of elongated sheet metal sections 32 and 33, with a 90-degree bend along the longitudinal centerline and with 45-degree flanges 34 and 35 along the outer sides (FIG. 3). The sections 32 and 33 are located face-to-face, with the opposed flanges 34, 35 joined to form a rigid beam with a generally square, transverse cross section except for the outwardly extending flanges.

At each end of the composite box-shaped beam 31 is a shaker shaft 36 (FIG. 1) with a steel bushing 37 welded thereon to fit within the respective end of the beam 31 and define the square cross section. The shafts 36 are journaled in bearing members 38 located at opposite ends of the housing 11.

A plurality of holes are bored at uniformly spaced locations along the flanges 34 and 35, and the ends of the J-hooks 28 extend through the holes. The end portions of the J-hooks 28 are threaded and adjusting nuts 39 and 40 are used to secure the J-hooks firmly in position. As indicated in FIG. 2, 12 hooks are provided along each side of a bag support beam 31 so that a total of 24 filter bags 25 are supported by each.

One of the shaker shafts 36 of each bag support beam 31 has a crank arm 41 fastened thereon (FIG. 3) so that all of the bag support beams are provided at the same end with parallel, downwardly extending crank arms 41 that are used to pivot the beams back and forth during the shaking operation to shake the bags in a desired manner and thereby dislodge the filter cake formed therein.

As indicated in FIGS. 2 and 3, the three parallel crank arms 41 at the lefthand side of the housing 11 are pivotally interconnected to a horizontal link 42, while the three parallel crank arms 41 at the righthand side are interconnected by a second horizontal link 43. The inner ends of the links 42 and 43 are each connected to connecting links 44 and 45 which, in turn, are connected at their opposite ends to a pivot bar 46. The pivot bar 46 is pivotally mounted on a fixed pivot pin 47 and the connecting pins 48, 49 for the links 45 and 46 are at equal but oppositely spaced locations from the axis of the fixed pivot pin 47.

As the pivot bar 46 is pivoted back and forth, it drives the connecting links 44 and 45 in opposite directions to correspondingly move the horizontal links 42 and 43 in opposite directions, which in turn moves the respective crank arms 41 back and forth to shake the filter bags 25. By moving the horizontal links 42 and 43 in opposite directions, balancing motions and forces are produced which minimize vibration in the dust collector during the shaking operation.

The pivot bar 46 is driven by a motor and reducer unit 50. The drive unit 50 that is used in the present design is a 1½ hp 420 rpm Reuland ROCA motor reducer, with an output shaft 51 having a key slot 52.

The pivot bar 46 is pivoted back and forth by means of an adjustable-throw cranking mechanism 60 embodying the invention. The mechanism 60, best shown in FIGS. 4 through 11, comprises an adjustable-throw crank pin assembly that includes a crank hub 61 with a central bore 62 having a key slot 63. The bore 62 receives the motor reducer shaft 51, which is secured therein by a key 64 and a setscrew 65 that seats the key 64 and locks it in position.

Figure 5:
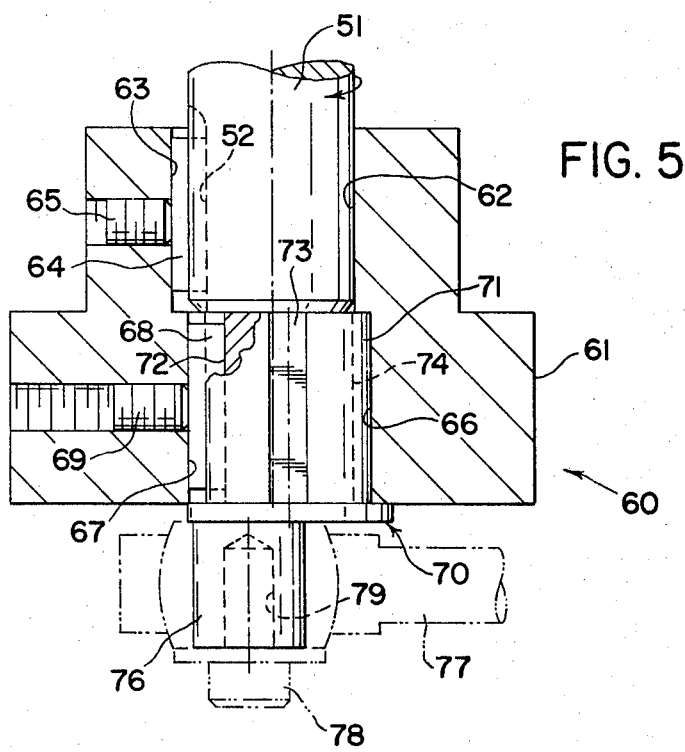
FIG. 5 is a fragmentary, sectional view taken on the line 5—5 of FIG. 4, with parts broken away and shown in section for the purpose of illustration.

The opposite end of the hub 61 has an eccentric bore 66 formed therein with its axis offset from the axis of the bore 62, and thus from the axis of the motor reducer output shaft 52, as shown in FIG. 5. The eccentricity between the two bores 62 and 66 in the present instance is 3/32 inch. The eccentric bore 66 is provided with a key slot 67 that receives a key 68 which is secured by a setscrew 69. The bore 66 receives the other part of the adjustable throw crank pin assembly, namely, the crank pin member 70, which has a cylindrical main body 71 with four uniformly spaced, axially extending key slots 72, 73, 74, and 75 located circumferentially 90° from one another. The main body 71 is adapted to be received in the eccentric bore 66. The crank pin 76 itself is located on the opposite end of the main body 71, and has its axis offset 9/32 inch from the axis of the main body.

The main body 71 may be received in the eccentric bore 66 in any one of four predetermined positions, the connection being accomplished by placing the key 68 received in the key slot 67, as well as in the one of the four key slots 72, 73, 74, and 75, and then tightening the key 68 in position with the setscrew 69. Each of the four positions as illustrated in FIGS. 7 through 11 provides a different offset of the axis of the crank pin 76 from the axis of the motor shaft 51 as illustrated diagrammatically in FIG. 7. The offset, or in other words the crank throw shown in FIG. 8, using the key slot 72, is $\frac{3}{8}$ inch; that shown in FIG. 9 using the key slot 73 is $\frac{1}{2}$ inch; that shown in FIG. 10 using the key slot 74 is $\frac{5}{8}$ inch; while that shown in FIG. 11 using the key slot 75 is $\frac{3}{4}$ inch. The crank pin 76 has a connecting rod 77 connected thereto at one end and connected to the lower end of the pivot bar at the opposite end. The connecting rod is anchored in place by means of a mounting screw 78 received in a threaded axial bore 79 in the crank pin.

Figure 6:
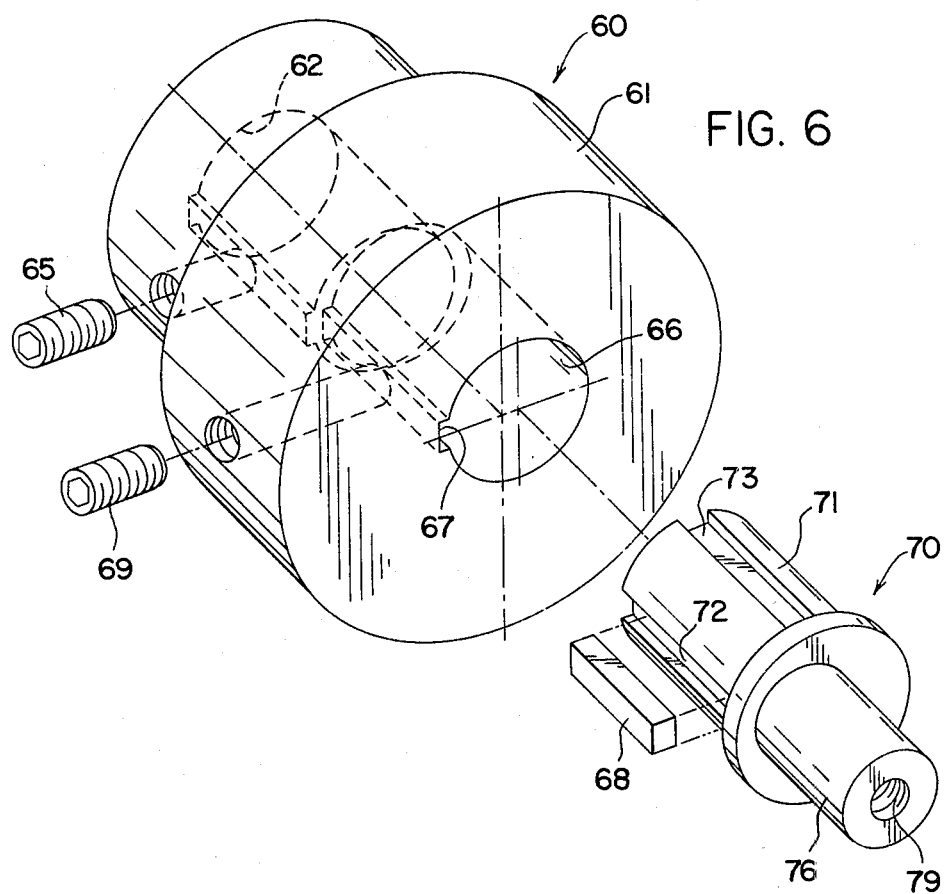
FIG. 6 is an exploded, perspective view of the eccentric hub and crank pin assembly of FIGS. 4 and 5.
Figure 7:
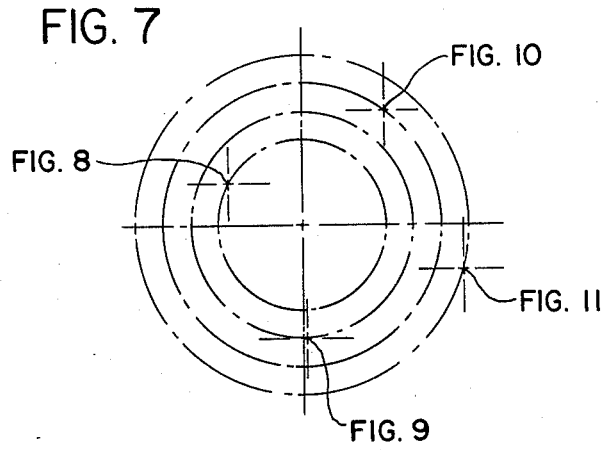
FIG. 7 is a diagrammatic view of the eccentric hub of FIG. 6.
Figure 8:
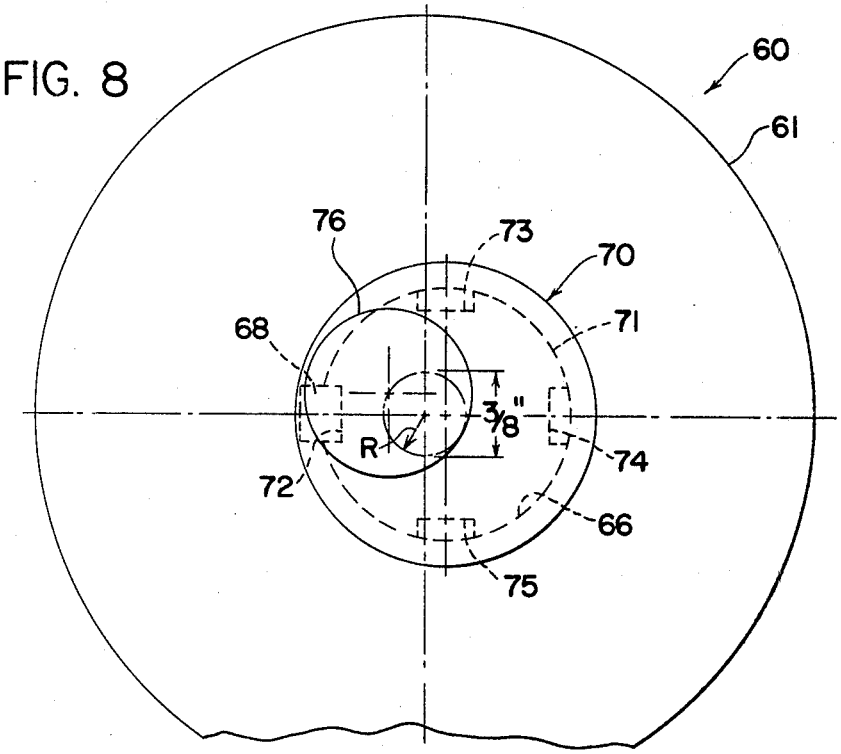
FIGS. 8, 9, 10 and 11 are diagrammatic views on an enlarged scale, illustrating the various positions of the adjustable crank pin in the hub to achieve different crank throws for the bag shaker mechanism.
Figure 9:
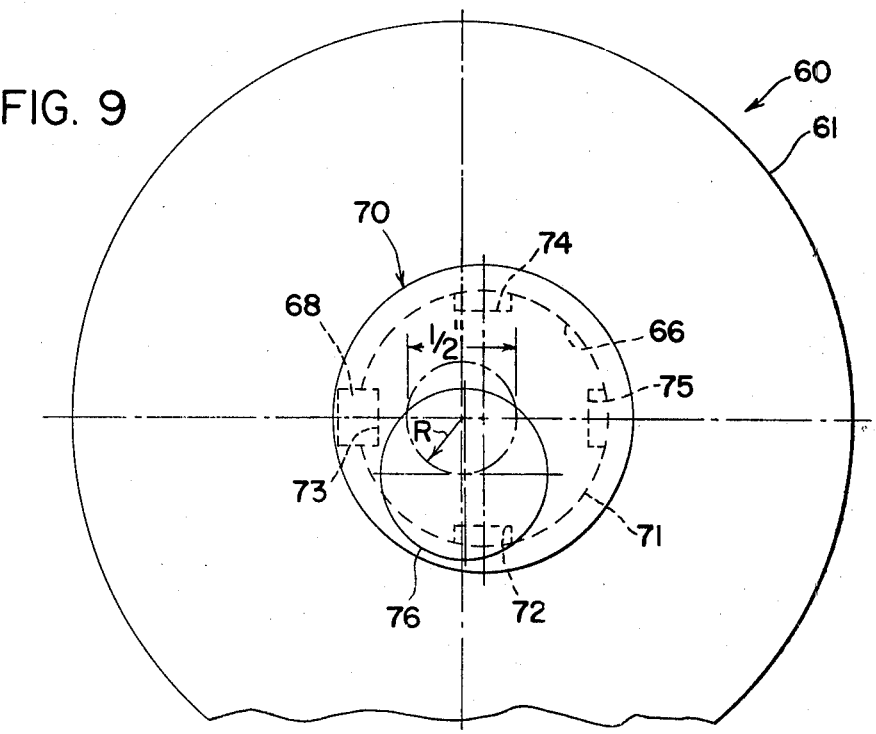
Figure 10:
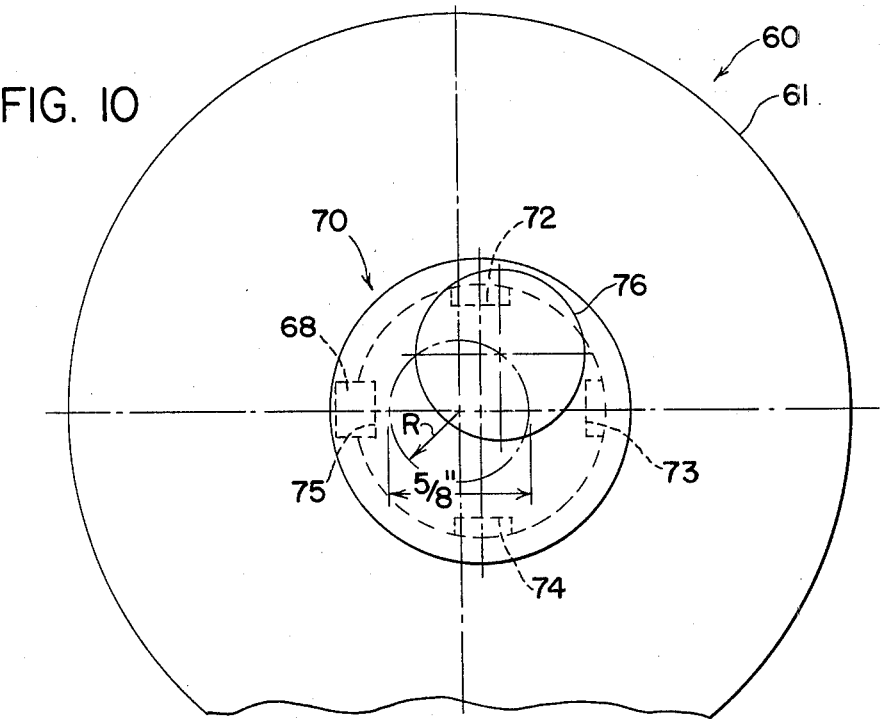
Figure 11:
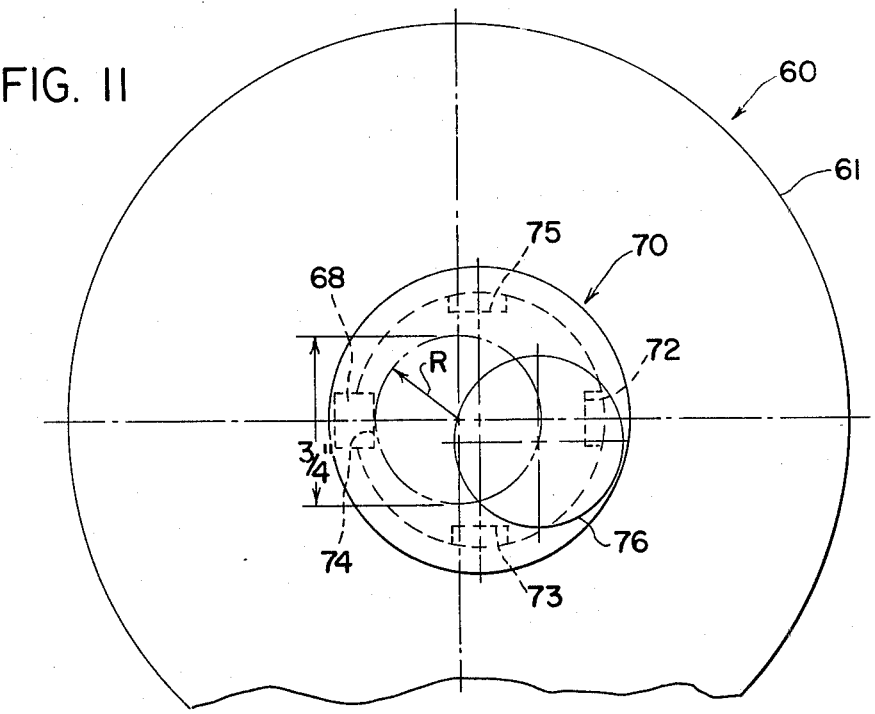

As illustrated in FIG. 6, the adjustment in the throw of the crank pin is very easily made. All that need be done to achieve this is to loosen the setscrew 68, release the connecting rod 77, using the screw 78, and remove the main body 71 of the crank pin member 70 from the eccentric bore 66. Then a new position of the four available positions is selected, the key 68 is inserted in the new key slot, and the main body 71 of crank pin member 70 is reinserted in the eccentric bore 66. Finally the setscrew 69 is tightened and the connecting rod 77 is fastened, using the screw 78.

As indicated above, the crank throw determines the amplitude of oscillations induced in the filter bags 25 during the bag shaking operation, and different amplitudes of oscillation will produce optimum results under certain conditions. Accordingly, the provision for quick adjustment of the crank throw permits the determination of the optimum oscillation amplitude by a trial and error technique.

While the invention has been shown and described with respect to a specific embodiment thereof, this is intended for the purpose of illustration rather than limitation, and other variations and modifications of the specific device herein shown and described will be apparent to those skilled in the art, all within the intended spirit and scope of the invention. Accordingly, the patent is not to be limited in scope and effect to the specific device herein shown and described, nor in any other way that is inconsistent with the extent to which the progress in the art has been advanced by the invention.

What is claimed is:

1. In a bag shaker mechanism for a dust collector system of the type that uses a plurality of filter bags that receive particle-laden air through openings at their lower ends and which are supported at the top by said bag shaker mechanism which is adapted to periodically shake the bags to dislodge and remove accumulated dust, said bag shaker mechanism comprising bag support means, eccentric means operatively associated with said bag support means and a rotary drive motor with a shaft operatively connected to drive said eccentric means to produce a sinusoidal shaking of said filter bags, the improvement wherein said eccentric means comprises:

a hub having means at one end by which said hub is secured to said motor shaft, and having a bore at its other end with its axis offset from the axis of said shaft;

a crank arm member with a cylindrical main body at one end adapted to be received in said bore of said hub and with a crank pin on the other end thereof with its axis offset from the axis of said main body; and means on said cylindrical main body and said bore for releasably securing said cylindrical main body in said bore coaxially therewith selectively in any one of a plurality of positions of different angular relationship to permit selective adjustment of the throw of said eccentric means and thus to select a desired amplitude of shaking motion imparted to said filter bags.

2. A bag shaker mechanism as defined in claim 1, wherein said securing means includes first keying means in one of said main body and said bore and a plurality of second keying means at spaced circumferential locations in the other of said main body and said eccentric bore, each of said second keying means being selectively cooperable with said first keying means to permit respective keying of said cylindrical main body to said eccentric bore.

3. A bag shaker mechanism as defined in claim 2, wherein said second keying means comprises four uniformly circumferentially spaced key slots.

4. A bag shaker mechanism as defined in claim 2, wherein said second keying means is in said cylindrical main body.

* * * * *